United States Patent
Hakes et al.

(10) Patent No.: US 12,286,174 B2
(45) Date of Patent: Apr. 29, 2025

(54) ROLLER MOUNTING AND ROLLER BLOCK ASSEMBLIES FOR GROUND-ENGAGING TRACK SYSTEM

(71) Applicant: Caterpillar Inc., Peoria, IL (US)

(72) Inventors: David Jennings Hakes, Princeville, IL (US); Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 717 days.

(21) Appl. No.: 17/477,042

(22) Filed: Sep. 16, 2021

(65) Prior Publication Data

US 2023/0083649 A1    Mar. 16, 2023

(51) Int. Cl.
*B62D 55/096* (2006.01)
*B62D 55/10* (2006.01)
*B62D 55/15* (2006.01)

(52) U.S. Cl.
CPC ......... *B62D 55/0966* (2013.01); *B62D 55/10* (2013.01); *B62D 55/15* (2013.01)

(58) Field of Classification Search
CPC .............. B62D 55/096; B62D 55/0966; B62D 55/1086; B62D 55/10; B62D 55/14; B62D 55/15
USPC .................................. 180/9.1; 305/130, 138
See application file for complete search history.

(56) References Cited

U.S. PATENT DOCUMENTS

| | | | |
|---|---|---|---|
| 2,723,137 A | 11/1955 | Bidwell | |
| 2,775,492 A * | 12/1956 | Wirkkala | B62D 55/15 305/138 |
| 2,809,077 A * | 10/1957 | Christensen | B62D 55/15 384/428 |
| 2,952,495 A * | 9/1960 | Herr, Jr. | B62D 55/15 305/138 |
| 3,869,179 A | 3/1975 | Ricca et al. | |
| 3,985,402 A | 10/1976 | Reinsma | |
| 4,141,598 A * | 2/1979 | Cline | B62D 55/15 384/418 |
| 6,739,679 B2 | 5/2004 | Ueno et al. | |
| 8,733,850 B2 | 5/2014 | Park et al. | |
| 10,597,098 B2 | 3/2020 | Vik et al. | |
| 10,661,847 B2 | 5/2020 | Wagner | |
| 2006/0267304 A1 | 11/2006 | Park et al. | |
| 2021/0039729 A1 | 2/2021 | Hakes | |
| 2023/0234651 A1* | 7/2023 | Hilman | B62D 55/12 |

FOREIGN PATENT DOCUMENTS

| | | |
|---|---|---|
| CN | 104724195 A | 6/2015 |
| GB | 2536635 | 9/2016 |
| JP | H03193573 A | 8/1991 |

* cited by examiner

*Primary Examiner* — Christopher B Wehrly

(57) ABSTRACT

A roller mounting assembly for a ground-engaging track system includes a frame, and a roller block coupled to the frame and including a shaft support surface extending through the roller block. The roller mounting assembly further includes a damper resiliently deformable, relative to the roller block, to dampen loads transmitted between the roller block and the frame. Embodiments of a roller block assembly and a damping shim assembly are also disclosed.

15 Claims, 5 Drawing Sheets

ABSTRACT## ROLLER MOUNTING AND ROLLER BLOCK ASSEMBLIES FOR GROUND-ENGAGING TRACK SYSTEM

TECHNICAL FIELD

The present disclosure relates generally to a roller mounting assembly for a ground-engaging track system, and more particularly to a damper positionable between a roller block and a frame to dampen loads transmitted therebetween.

BACKGROUND

Track-type machines are used throughout the world in all manner of applications, ranging from construction, mining, and forestry to landfill applications and many others. In a typical arrangement, tracks formed of track links coupled together in an end-to-end arrangement extend about rotatable track-contacting elements including one or more idlers and a drive sprocket. Track rollers support a majority of a weight of the track-type machine and are mounted to a track roller frame. Field service applications for track-type tractors and other track-type machines are typically very harsh, with such machines pushing or pulling substantial loads and operating in hard, rocky, or slippery underfoot conditions.

Certain track-type machines, and notably track-type tractors used in construction and road building, for example, are also required to perform various operations that require relatively fine control and interaction with substrate materials. Track-type machines can be used in grading operations, for example, where it is desirable to prepare a substrate to a relatively smooth and level condition. In a typical grading operation, an implement system including a blade can be operated to push and distribute substrate material with relatively little tolerance for aberrations in the height of the blade. As the track in such a machine rotates around the front idler, for example, the leading few grousers must be planted into the ground, typically by weight of the idler or the first one of the several track rollers bearing down, or both. Depending upon substrate conditions, wear state of the track, machine speed, and other factors, the machine and blade can be caused to react to the ground penetration force applied to the grouser(s), resulting in bounce.

Track-type tractors can also be very sensitive to the state and condition of the track system, notably wear state. For optimized performance during grading operations and others, the position of the front idler vertically relative to other parts of the machine can be of significant importance. As wear and field service hours accrue over time, it can be necessary to adjust a vertical position of the idler. U.S. Pat. No. 7,237,631 to Livesay et al. is directed to a vertical idler adjuster for a track-type machine. In the Livesay strategy, spacers are carried on-board the machine and can be repositioned to adjust a vertical location of the idler. While Livesay undoubtedly performs well for various applications, this strategy does not appear to address bouncing or other disturbance to implement position that can occur during service.

SUMMARY

In one aspect, a roller mounting assembly for a ground-engaging track system includes a frame, and a roller block coupled to the frame. The roller block includes an upper surface and a lower surface each extending between a forward edge and a back edge of the roller block, an inboard side, and an outboard side. The roller block further includes a shaft support surface extending through the roller block in an inboard-outboard direction and circumferentially around a center axis. The roller mounting assembly further includes a damper having a fore-aft length, an inboard-outboard width less than the fore-aft length, and a vertical thickness less than the inboard-outboard width. The damper is resiliently deformable, relative to the roller block, to dampen loads transmitted between the roller block and the frame.

In another aspect, a roller block assembly for supporting a roller in a ground-engaging track system includes a roller block having an upper surface and a lower surface each extending between a forward edge and a back edge of the roller block, an inboard side, and an outboard side. The roller block further includes a shaft support surface extending through the roller block in an inboard-outboard direction and circumferentially around a center axis, a first bolt bore extends through the roller block between the upper surface and the lower surface, and a second bolt bore extending through the roller block between the upper surface and the lower surface. The roller block assembly further includes a damper coupled to the roller block, and a first sleeve and a second sleeve within the first bolt bore and the second bolt bore, respectively. Each of the first sleeve and the second sleeve extends out of the respective first bolt bore or second bolt bore and at least partially through the damper.

In still another aspect, a damping shim assembly for a roller in a ground-engaging track system includes a non-damping shim, and a damping shim coupled to the non-damping shim and having a fore-aft length, an inboard-outboard width less than the fore-aft length, and a vertical thickness less than the inboard-outboard width. The damping shim further defines a longitudinal axis, and includes a forward damper end, a back damper end, a first longitudinal edge extending continuously between the forward damper end and the back damper end, and a second longitudinal edge opposite to the first longitudinal edge and forming a locating cutout extending inwardly in a direction of the longitudinal axis. The damping shim is resiliently deformable relative to the non-damping shim.

DETAILED DESCRIPTION

Figure 1:
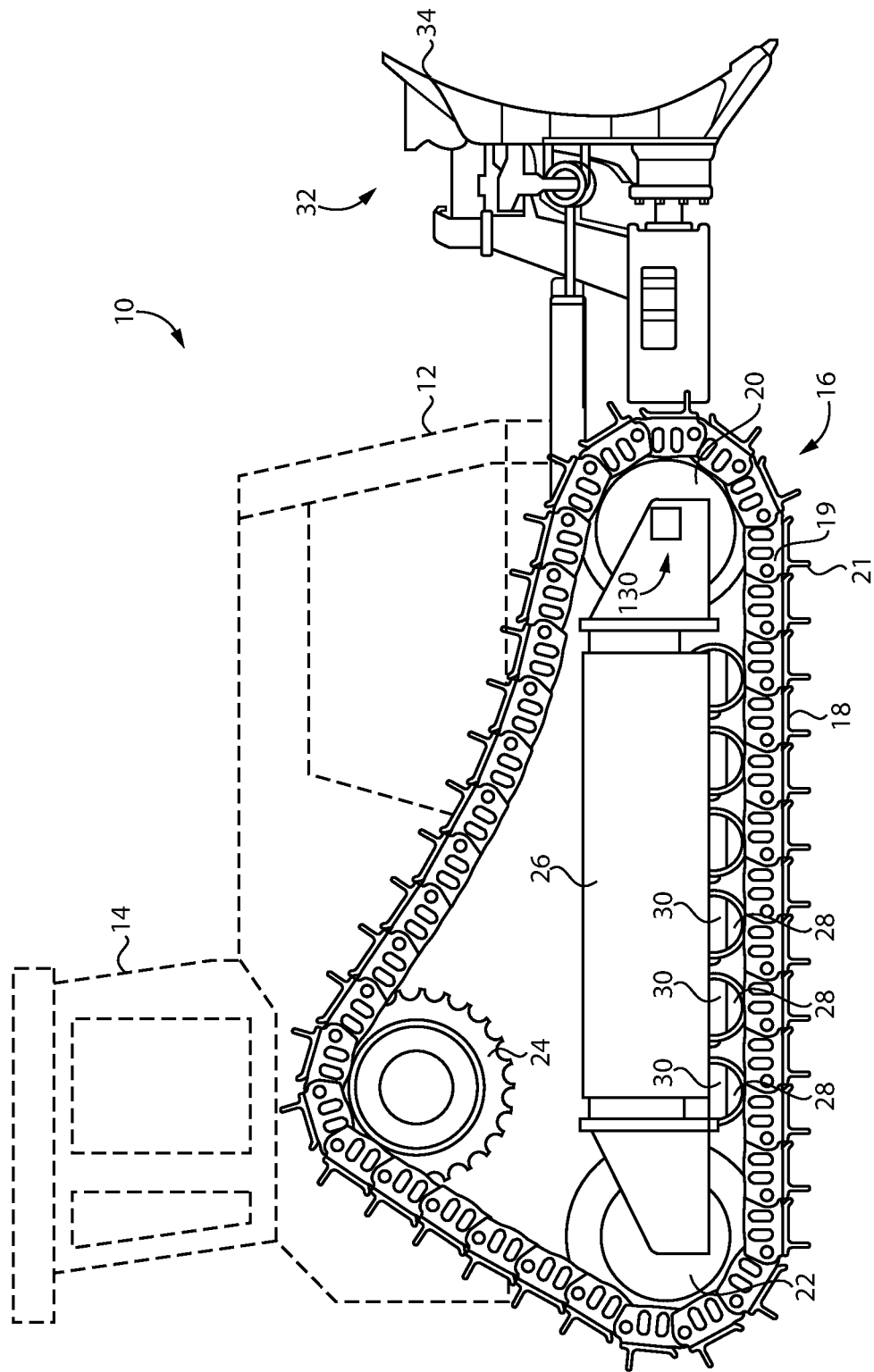
FIG. 1 is a side diagrammatic view of a machine, according to one embodiment.
Figure 2:
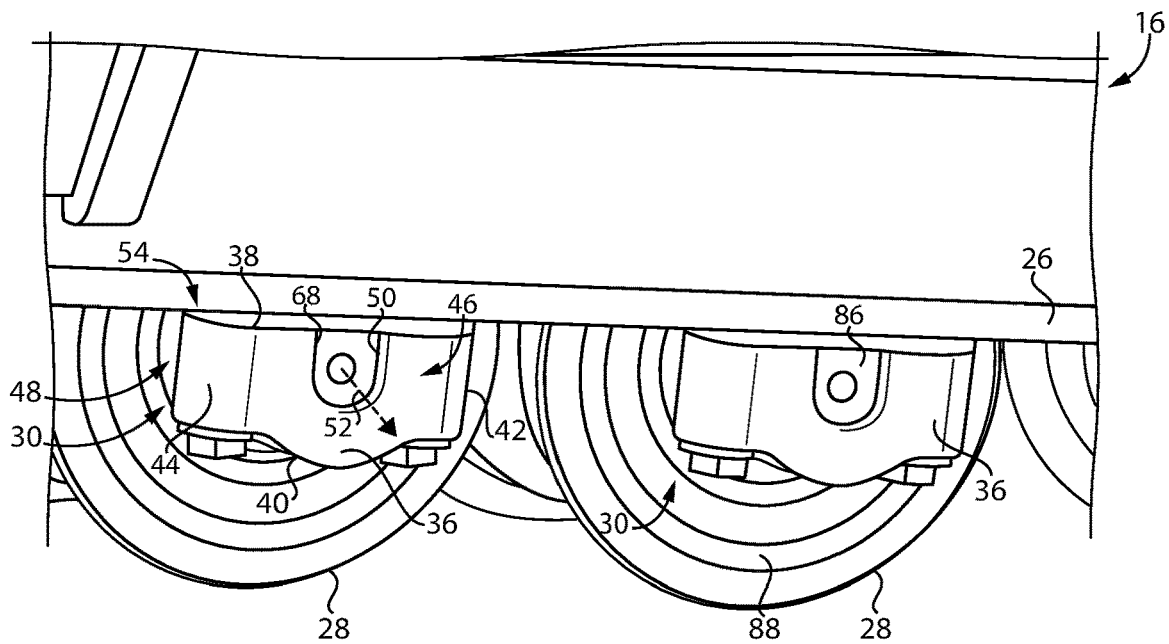
FIG. 2 is a diagrammatic view, in perspective, of portions of the machine of FIG. 1.
Figure 3:
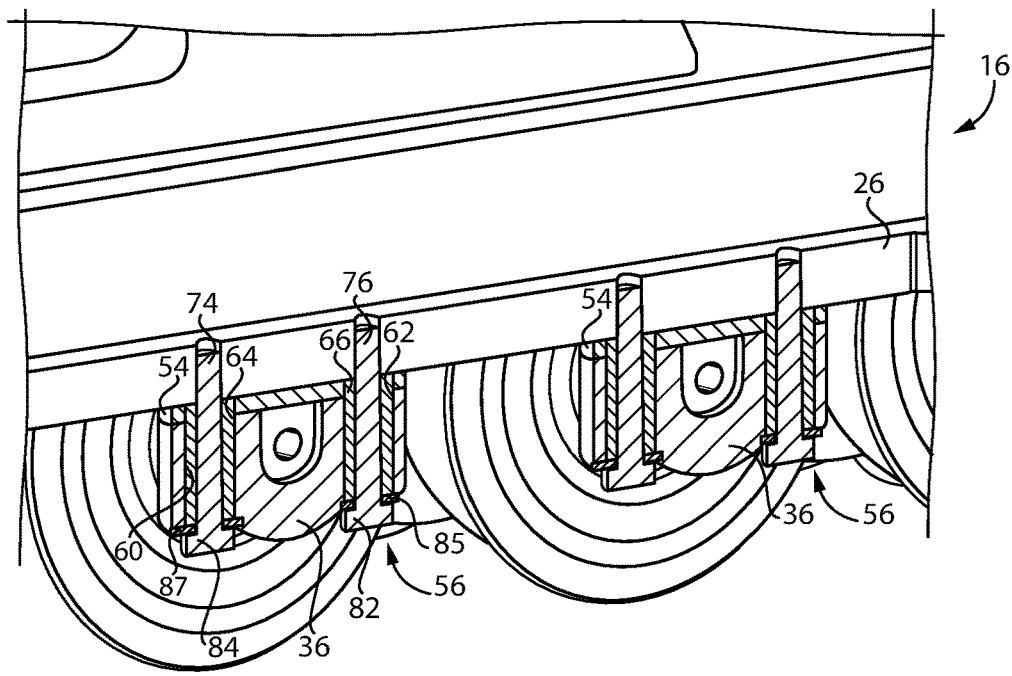
FIG. 3 is a sectioned view similar to FIG. 2.

Referring to FIG. 1, there is shown a track-type machine 10, according to one embodiment. Track-type machine 10 is shown in the context of a track-type tractor. Other track-type machines including excavators, track-type loaders, and a variety of others are contemplated within the context of the present disclosure. Track-type machine 10 includes a frame 12 and a cab 14 supported on frame 12. Track-type machine 10 further includes a ground-engaging track system 16. Track system 16 includes a track 18 formed by a plurality of track links 19 coupled end-to-end and extending about a front idler 20, a back idler 22, and a drive sprocket 24. In the illustrated embodiment, track system 16 is arranged in a so-called "high drive" configuration, however, in other instances a track system according to the present disclosure could have an oval configuration or still another. A plurality of track rollers 28 are mounted to a track roller frame 26. An additional ground-engaging track is positioned at an opposite side of frame 12 from that depicted in FIG. 1 and will typically be substantially identical to track 18. Track-type machine 10 further includes an implement system 32 including an implement 34 shown as a blade in the illustrated embodiment. Track-type machine 10 further includes a plurality of roller mounting assemblies 30. In the illustrated embodiment roller mounting assemblies 30 are structured for mounting track rollers 28. Track-type machine 10 may further include a roller mounting assembly 130 associated with front idler 20 and could further include a roller mounting assembly of similar structure associated with back idler 22 in some embodiments. It will be appreciated that a "roller" as contemplated herein includes a track roller 28, an idler 20, 22, or potentially still other rotatable track-contacting elements in a ground-engaging track system. As will be further apparent from the following description roller mounting assemblies 30 and roller mounting assembly 130 are configured for damping shocks and vibrations during service.

Referring also now to FIGS. 2-5, there are shown features of roller mounting assemblies 30 in further detail. It should also be appreciated that description herein of roller mounting assemblies 30, hereinafter referred to at times in the singular, can be understood by way of analogy to refer to features and functionality of roller mounting assembly 130 except where otherwise indicated or apparent from the context. Roller mounting assembly 30 includes a frame, which in the illustrated case is track roller frame 26. Roller mounting assembly 30 further includes a roller block 36 coupled to frame 26 and having an upper surface 38 and a lower surface 40 each extending between a forward edge 42 and a back edge 44 of roller block 36.

Roller block 36 further includes an inboard side 46, oriented to face a direction toward machine 10, into the page in FIG. 1, and an outboard side 48 oriented to face away from machine 10, out of the page in FIG. 1. Roller block 36 further includes a shaft support surface 50 extending through roller block 36 in an inboard-outboard direction and circumferentially around a center axis 52. Shaft support surface 50 may further form a channel 68 opening at upper surface 38 that receives a roller shaft 86. In other embodiments, a shaft support surface could form a cylindrical or non-cylindrical bore. Those skilled in the art will recognize that roller block 36 in the embodiments of FIGS. 2-5 includes a collar block, having a form and functionality of a collar that is bolted to frame 26 to secure one end of roller shaft 86. Roller shaft 86 will typically not rotate within roller block 36. An additional collar block not illustrated will be understood to support an opposite end of roller shaft 86. As can be seen in the Figures each track roller 28 includes a roller shell 88 rotatable about the respective roller shaft 86 and structured to ride in contact with track links 19 in track 18.

Roller mounting assembly 30 further includes a damper 54. Damper 54 is resiliently deformable, relative to roller block 36, to dampen loads transmitted between roller block 36 and frame 26. In embodiments illustrated herein damper 54 is sandwiched vertically between roller block 36 and frame 26 and may contact at least one of roller block 36 or frame 26, although the present disclosure is not thereby limited. Roller block 36 may further include a first bolt bore 60 extending through roller block 36 between upper surface 38 and lower surface 40, and a second bolt bore 62 extending through roller block 36 between upper surface 38 and lower surface 40.

Roller block 36 and damper 54 may form parts of a roller block assembly 56 for supporting a roller in track system 16. Roller block assembly 56 may include a first sleeve 64 and a second sleeve 66 within first bolt bore 60 and second bolt bore 62, respectively. Each of first sleeve 64 and second sleeve 66 extends out of the respective first bolt bore 60 and second bolt bore 62 and at least partially through damper 54. When roller block assembly 56 is coupled to frame 26 for service first sleeve 64 and second sleeve 66 may be clamped in contact with frame 26. Roller block assembly 56 may further include a first bolt 74 and a second bolt 76 extending through first sleeve 64 and first bolt bore 60 and through second sleeve 66 and second bolt bore 62, respectively, and threaded engaged with frame 26. Each of first bolt 74 and second bolt 76 may include a threaded shank end 78 and 80, respectively, extending through damper 54, and a bolt head 82 and 84 opposite to the respective threaded shank end 78 and 80. A first washer 85 and a second washer 87 may be clamped respectively between first bolt 74 and second bolt 76 and roller block 36.

Figure 4:
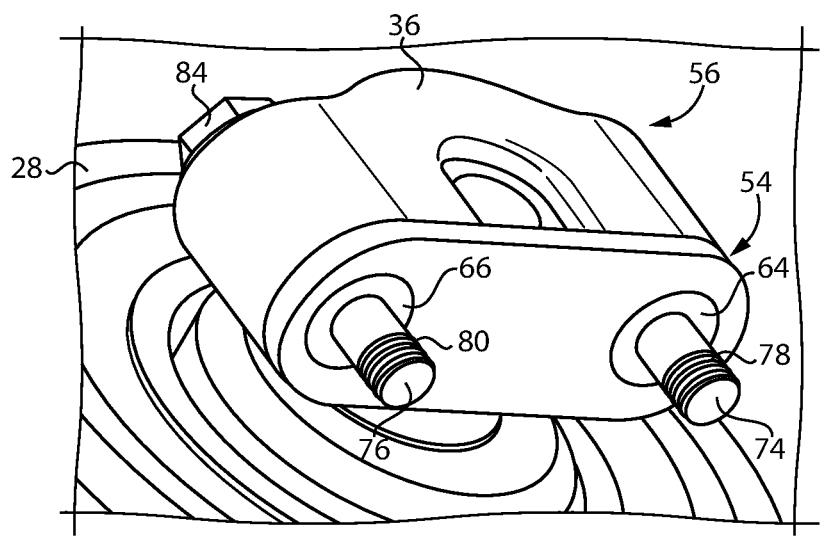
FIG. 4 is a diagrammatic view, in perspective, of a roller block assembly and roller, according to one embodiment.
Figure 5:
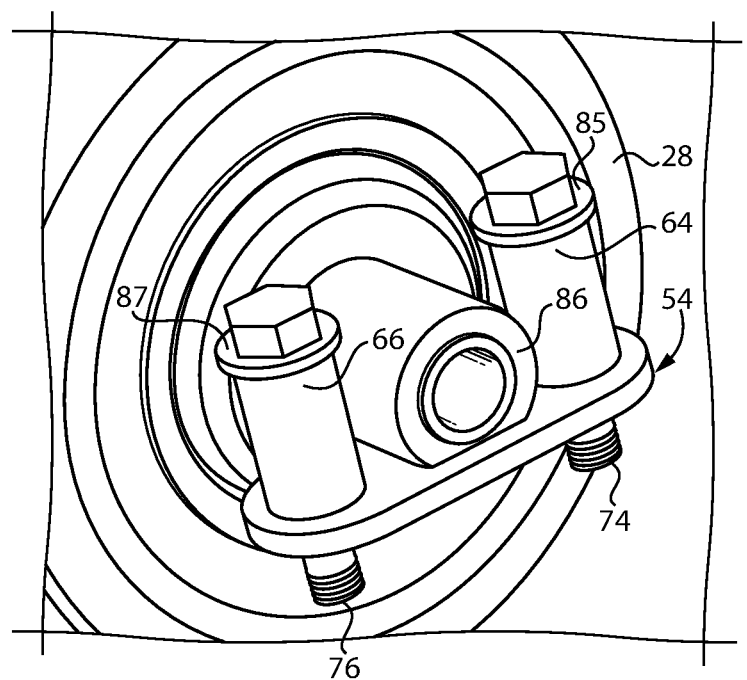
FIG. 5 is a diagrammatic view of portions of the roller block assembly and roller of FIG. 4.
Figure 8:
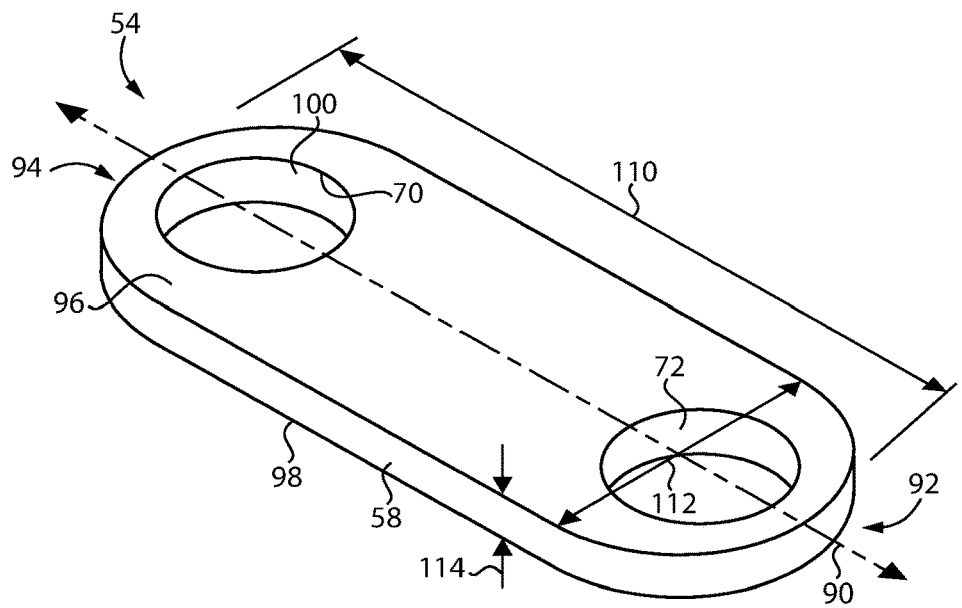
FIG. 8 a diagrammatic view of a damper, according to one embodiment.

Referring also now to FIG. 8, there is shown damper 54 in further detail. Damper 54 may have the form of a non-metallic shim positioned in service in contact with at least one of roller block 36 or frame 26. Damper 54 includes a fore-aft length 110, an inboard-outboard width 112 less than the fore-aft length, and a vertical thickness 114 less than inboard-outboard width 112. Damper 54 may further include a first sleeve hole 70 formed therein and receiving first sleeve 64, and a second sleeve hole 72 formed therein and receiving second sleeve 66. Damper 54 and roller block 36 may have matched outer peripheral profiles as best depicted in FIG. 4.

Damper 54 further defines a damper longitudinal axis 90 and includes a forward damper end 92, a back damper end 94, an upper damper surface 96, a lower damper surface 98, and at least one locating surface 100 longitudinally between forward damper end 92 and back damper end 94 and extending between upper damper surface 96 and lower damper surface 98. In the illustrated embodiment locating surface 100 interacts with another surface in roller block assembly 56, including a surface of a respective one of first sleeve 64 or second sleeve 66, for example, to maintain damper 54 in place. When assembled for service in roller mounting assembly 30 sleeves 64 and 66 are clamped in a hard or solid connection between bolt heads 82 and 84, respectively, and frame 26. Damper 54 is clamped when assembled between roller block or collar block 36 and frame 26. In this way, vibrations or loading imparting a tendency for roller block 36 to squish vertically between frame 26 and roller block 36 are permitted, but separation vertically between frame 26 and roller block 36 more than a vertical thickness of damper 54 is limited by way of the bolted connections.

Figure 6:
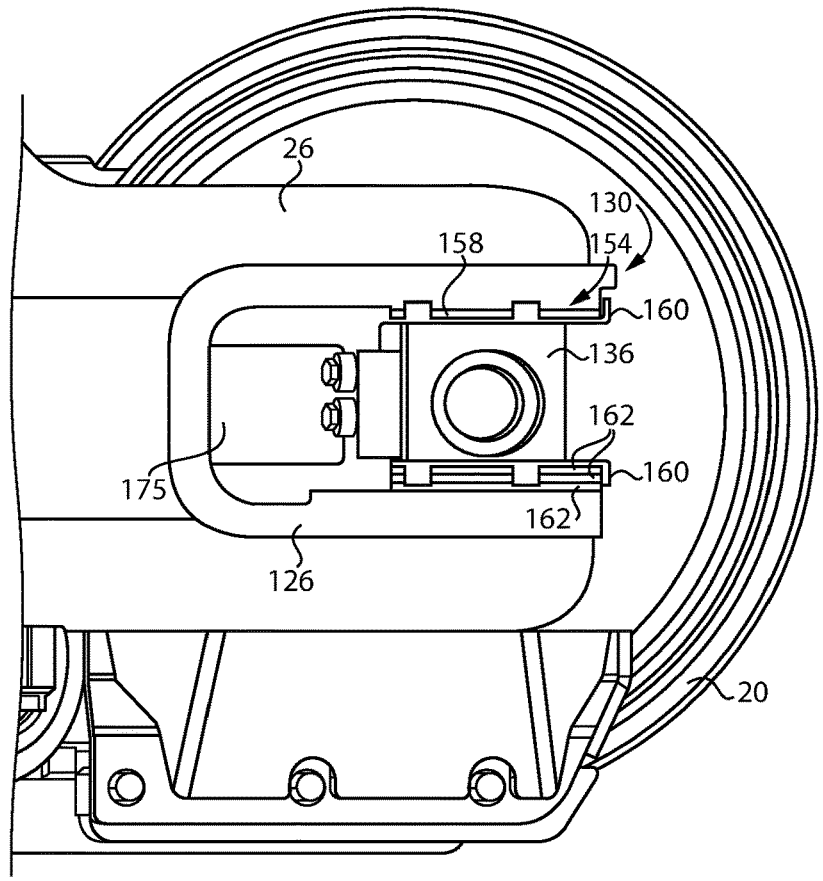
FIG. 6 is a side diagrammatic view of portions of a track system, including a roller mounting assembly, according to one embodiment.
Figure 7:
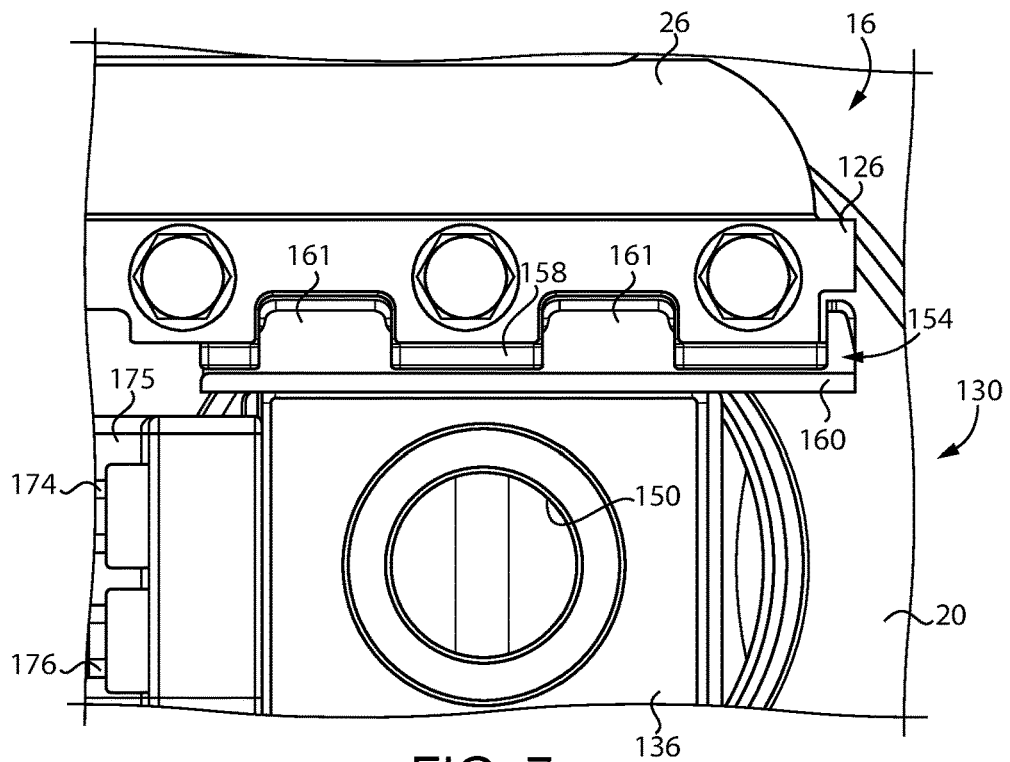
FIG. 7 is another side diagrammatic view of portions of a track system, including a roller mounting assembly, according to one embodiment.
Figure 9:
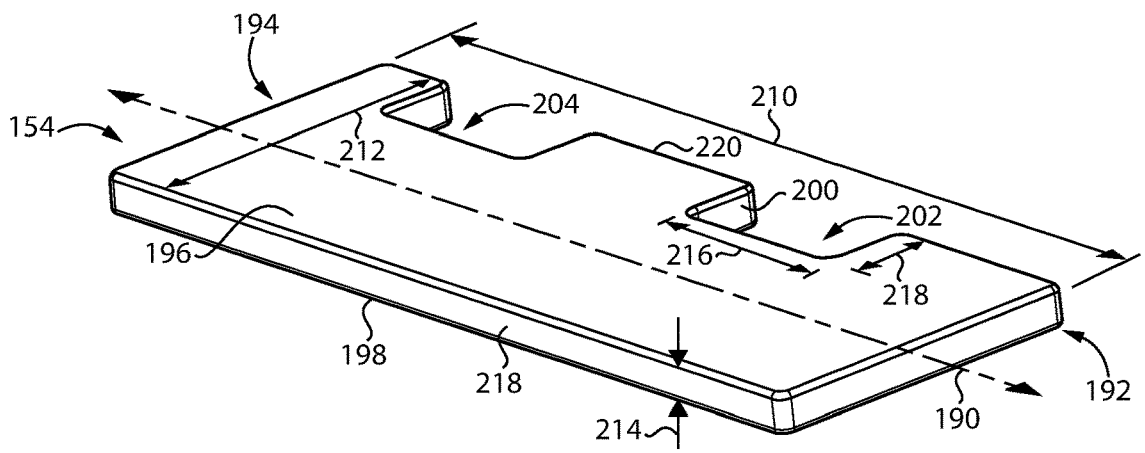
FIG. 9 is a diagrammatic view of a damper, according to one embodiment.

Turning now to FIGS. 6, 7, and 9 there are shown features of roller mounting assembly 130. Roller mounting assembly 130 could be used with or without roller mounting assembly 30 in a machine application, and is structured for damping loads associated with front idler 20 during service. Roller mounting assembly 130 includes a frame 126. In the illustrated embodiment frame 126 is a so-called C-channel that is attached such as by bolting to track roller frame 26. During service idler 20 can experience loading in a fore-aft direction, and a roller block 136 supports idler 20 slidably relative to frame 126. An idler yoke 175 can be attached to roller block 136 by way of bolts 174 and 176. Those skilled in the art will be familiar with fore-aft movement of an idler block or idler caps in sliding relation to a C-channel or other supporting frame. Roller mounting assembly 130 further includes a shaft support surface 150 extending in an inboard-outboard direction through roller block 136 and fully circumferentially around a center axis to form a cylindrical bore for supporting a shaft (not numbered) of idler 20. Apparatus similar or identical to that depicted in FIGS. 6 and 7 will be associated with an opposite side of idler 20 from that which is illustrated. Roller mounting assembly 130 further includes a damper 154. Damper 154 can operate generally analogously to damper 54 discussed above to dampen loads transmitted between roller block 136 and frame 126, although damper 154 can slide fore-aft with roller block 136 relative to frame 126 in at least some embodiments.

Roller mounting assembly 130 may further be structured for adjustment of idler 20 vertically relative to track roller frame 26. To this end, damper 154 can include a non-metallic damping shim 158 in contact with at least one of roller block 136 or frame 126 in some embodiments, and used cooperatively with other shim or shim-like components. Roller mounting assembly 130 may further include a metallic shim carrier 160 coupled to non-metallic shim 158, as well as one or more standard metallic shims 162 also sandwiched vertically between roller block 136 and frame 126. Metallic shim carrier 160 can also function as a shim and includes locating posts 161 providing generally a complementary fit relationship within locating cutouts 202 and 204 in non-metallic shim 158 and analogously within locating cutouts (not shown) within standard shims 162. Damper 154/non-metallic shim 158 is resiliently deformable relative to roller block 136 and resiliently deformable relative to standard shim 162.

With continued focus on FIGS. 6, 7, and 9, damper 154 defines a damper longitudinal axis 190 and includes a forward damper end 192, a back damper end 194, an upper damper surface 196, a lower damper surface 198, and at least one locating surface 200 longitudinally between forward damper end 192 and back damper end 194 and extending between upper damper surface 96 and lower damper surface 98. Damper 154 may further include a first longitudinal edge 218 extending continuously between forward damper end 192 and back damper end 194, and a second longitudinal edge 220 opposite to first longitudinal edge 218. Second longitudinal edge 220 forms a locating cutout 202, defined in part by locating surface 200, and extending inwardly in a direction of longitudinal axis 190. Damper 154 may further include a second locating cutout 204 also formed by second longitudinal edge 220 and spaced longitudinally in damper 154 from first locating cutout 202. As noted above damper 154 can be understood as a damping shim or non-metallic shim 158.

Figure 10:
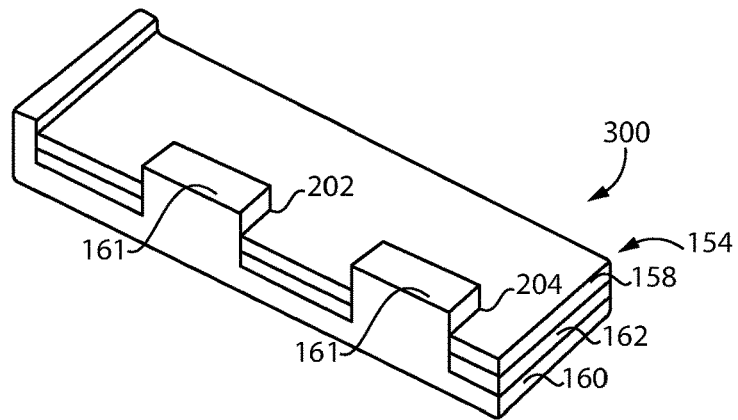
FIG. 10 is a diagrammatic view of a damping shim assembly, according to one embodiment.

Referring also now to FIG. 10, there is shown a damping shim assembly 300 for a roller in a ground-engaging track system, and including a non-damping shim 160, and a damping shim 158 coupled to non-damping shim 160. Damping shim 158 can be formed of a rubber material or another suitable rubber-like material including any of a variety of known elastomers, or a composite for example. Non-damping shim 162 can be formed of a metallic material such as an iron or steel material, for example. Damping shim 158 may be attached directly to non-damping shim 160 in some embodiments such as by way of an adhesive or cooperating mechanical features, for example. Also shown in FIG. 10 as part of damping shim assembly 300 is shim carrier 160. Shim carrier 160 can include locating posts 161 that are received in cutouts 204 and 202 when assembled for installation.

INDUSTRIAL APPLICABILITY

Referring to the drawings generally, when track-type machine 10 is operated to travel across a substrate, grousers 21 will typically penetrate into the substrate as they pass around and underneath front idler 20. The force of penetrating grousers 21 into the substrate can be transmitted to track roller frame 26, to machine frame 12, and to cab 14, resulting in relative vertical movement between and among the various components. Shocks and vibrations resulting from grouser penetration, or potentially grouser contact with a surface that is not penetrated, can negatively impact performance, notably with respect to certain fine operations such as grading, where a machine-mounted implement can be caused to bounce. In the case of roller mounting assembly 30 vertical squeezing of damper 54 between roller block 36 and track roller frame 26 can attenuate such shocks and vibrations. In the case of roller mounting assembly 130 generally analogous squeezing of damper 154 between roller block 136 and frame 126 can attenuate such shocks and vibrations.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A roller mounting assembly for a ground-engaging track system comprising:
    a frame;
    a roller block coupled to the frame and including an upper surface and a lower surface each extending between a forward edge and a back edge of the roller block, an inboard side, and an outboard side;
    the roller block further including a shaft support surface extending through the roller block in an inboard-outboard direction and circumferentially around a center axis;
    a damper having a fore-aft length, an inboard-outboard width less than the fore-aft length, and a vertical thickness less than the inboard-outboard width;

the damper is resiliently deformable, relative to the roller block, to dampen loads transmitted between the roller block and the frame;

the roller block further including a plurality of bolt bores therein, a plurality of sleeves within the plurality of bolt bores, and a plurality of bolts extending through the plurality of sleeves and the damper and threaded engaged with the frame so as to form a bolted connection; and the bolted connection clamping the plurality of sleeves between bolt heads of the plurality of bolts and the frame, and clamping the damper between the roller block and the frame.

2. The roller mounting assembly of claim 1 wherein the damper is sandwiched vertically between the roller block and the frame.

3. The roller mounting assembly of claim 2 wherein the damper includes a non-metallic shim in contact with at least one of the roller block or the frame.

4. The roller mounting assembly of claim 3 further comprising a metallic shim carrier coupled to the non-metallic shim.

5. The roller mounting assembly of claim 2 further comprising a standard shim sandwiched vertically between the roller block and the frame.

6. The roller mounting assembly of claim 1 wherein the damper defines a damper longitudinal axis and includes a forward damper end, a back damper end, an upper damper surface, a lower damper surface, and at least one locating surface longitudinally between the forward damper end and the back damper end and extending between the upper damper surface and the lower damper surface.

7. The roller mounting assembly of claim 6 wherein the damper includes a locating cutout defined in part by the at least one locating surface.

8. The roller mounting assembly of claim 1 wherein the roller block includes a collar block.

9. The roller mounting assembly of claim 8 wherein the collar block further includes the plurality of bolt bores therein extending between the upper surface and the lower surface, and the shaft support surface forms a channel opening at the upper surface.

10. A roller block assembly for supporting a roller in a ground-engaging track system comprising:

a roller block including an upper surface and a lower surface each extending between a forward edge and a back edge of the roller block, an inboard side, and an outboard side;

the roller block further including a shaft support surface extending through the roller block in an inboard-outboard direction and circumferentially around a center axis, a first bolt bore extending through the roller block between the upper surface and the lower surface, and a second bolt bore extending through the roller block between the upper surface and the lower surface;

a damper coupled to the roller block; and a first sleeve and a second sleeve within the first bolt bore and the second bolt bore, respectively, and each of the first sleeve and the second sleeve extending out of the respective first bolt bore or second bolt bore and at least partially through the damper.

11. The roller block assembly of claim 10 wherein the roller block includes a collar block.

12. The roller block assembly of claim 10 wherein the shaft support surface forms a channel opening at the upper surface.

13. The roller block assembly of claim 10 wherein the damper includes a first sleeve hole formed therein and receiving the first sleeve, and a second sleeve hole formed therein and receiving the second sleeve.

14. The roller block assembly of claim 13 further comprising a first bolt and a second bolt extending through the first sleeve and the second sleeve, respectively, and each having a threaded shank end extending through the damper, and a bolt head opposite to the respective threaded shank end.

15. The roller block assembly of claim 13 wherein the damper and the roller block include matched outer peripheral profiles.

* * * * *